United States Patent [19]

Ucinhazska et al.

[11] 4,382,555
[45] May 10, 1983

[54] DEVICE FOR THE FAST CHANGING OF THE OPERATING METHOD OF SPRAYING UNITS ON WHEELS

[76] Inventors: Bruno Ucinhazska, Johannesstrasse 6, 4408 Dülmen; Josef Disteldorf, Am Sengenhoff 2a; Werner Hübel, Am Birnenbruch 34, both of 4690 Herne 1; Siegfried Brandt, Grabenstrasse 8; Hans-Jürgen Haage, Gausstrasse 13, both of 4690 Herne 2, all of Fed. Rep. of Germany

[21] Appl. No.: 148,382

[22] Filed: May 9, 1980

[30] Foreign Application Priority Data

May 11, 1979 [DE] Fed. Rep. of Germany ....... 2918963

[51] Int. Cl.³ ............................................. F16L 55/00
[52] U.S. Cl. ..................................... 239/714; 239/178
[58] Field of Search .............. 239/178, 714, 717, 600, 239/523, 551, 522, 212, 587; 285/DIG. 22, 24, 26, 5, 6, 305

[56] References Cited

U.S. PATENT DOCUMENTS 4,135,738  1/1979  Clements ............................. 239/714

FOREIGN PATENT DOCUMENTS 1487141  5/1967  France ................................ 239/600

Primary Examiner—James B. Marbert
Attorney, Agent, or Firm—Oblon, Fisher, Spivak, McClelland & Maier

[57] ABSTRACT

A device for the fast changing of the operating method of field spraying units on wheels, wherein the field spraying unit has a socket and an attachment unit is connected thereto via a quick-acting coupling having a first coupling part with a universal nozzle and a prefilter, the attachment unit being connected with a second coupling part.

5 Claims, 1 Drawing Figure

DEVICE FOR THE FAST CHANGING OF THE OPERATING METHOD OF SPRAYING UNITS ON WHEELS

BACKGROUND OF THE INVENTION

1. Field of the Invention

The invention concerns a quick-acting coupling which permits the transition from one fluid distribution method to another of field spraying units on wheels without any great loss of time. This concerns preferably the transition from operating with spray nozzles to operating processes with the help of trailing hoses which are connected through distributor elements.

The field spraying units on wheels could be quickly introduced into agriculture owing to the multiple possibilities of utilization for the distribution of all kinds of substances on tilled fields, the easy operation when charging other substances and the easy way of getting them on the tilled fields and the saving of storage space. However, the multiple possibilities of utilization require also the use of different distribution techniques, for example, through nozzles of different design, drip tubes, trailhoses, etc.

2. Description of the Prior Art

When changing from one kind of application to another one, generally a cumbersome and time-consuming conversion of the spraying bar is necessary. As is known, the rods of field spraying units on wheels are 10–20 m long after being swung out, depending on the design. These tube rods which are connected to the storage container of the liquid to be distributed have sockets at a distance between them of 50 cm. As a rule, these sockets are equipped with nozzles which permit a uniform distribution of the liquid to be sprayed. If necessary, a ball valve filter and a dosing disk are installed between the socket and nozzle.

If it is the intention to convert from the nozzle spraying technique to a distribution with trailing hoses at distances of 25 cm between them, the nozzles must first be unscrewed. By doing so, the dosing disk and valve filter fall out, which must be inserted again before attaching a T-iron or Y-iron with a socket. Generally, the trailing hoses have been attached in advance to the distribution element with the help of hose liners and pipe clamps.

The operations are correspondingly cumbersome when using again other spray nozzles, for example, flat-section nozzles, or drip tubes.

SUMMARY OF THE INVENTION

It is an object of the invention to carry out the change from one kind of application to another with the shortest possible period of time and by causing as little expense as possible. Additionally, this change is to be possible for field spraying units of all kinds of designs and origin.

This object is accomplished according to the invention by means of a specially designed quick-acting coupling, where one coupling part, such as a screw cap, holds a universal nozzle and the valve filter at the same time and is directly connected with the socket of the field spraying unit while the counter-part of the coupling is connected with the respective attachment unit.

All suitable connecting pieces permit impact and percussion-safe, quick connections and can be adapted to the requirements at the socket of the field spraying unit and the attachment units can be used as quick-acting couplings. These are, in particular, all kinds of bayonet catches, jack and lock couplings. If required, the connection can be additionally secured by means of supplementary securing devices, such as screws, springs, snap closures and others. These couplings may contain installed gaskets or additional gasket rings may be placed between the two coupling parts.

The quick-acting couplings can be made of any material which is corrosion-resistant against the liquids to be distributed, particularly pesticides and fertilizer solutions. Chrome-nickel steels and hardened plastics are preferred for this purpose.

The connection between the socket on the field spraying unit and the one part of the coupling is preferably effected by screwing. However, if necessary, also hose connections with pipe clamps, ground connections with additional support devices and other kinds of connections are possible.

The connections between the attachment units and the counter-part of the coupling are to be made in an analogous manner. The connections of the two coupling parts with the socket of the field spraying unit or the attachment units can be the same as well as different ones.

Flat-section nozzles of all kinds of designs, drip tubes and distribution elements with trailing hoses can be used, among others, as attachment units. While the distribution elements of the trailing hoses can be connected, in general, directly with the coupling parts, it would be expedient in the case of the special nozzles and drip tubes to provide them first with short hose liners and then to attach to them the counter-part of the coupling elements. Also, special units with pipe joint connections can be attached to the coupling parts, for example, sub-leaf spraying tubes.

The universal nozzle which is attached to the socket of the field spraying unit with the other coupling element serves for the attachment units, so to speak, as a dosing device. However, if required, other dosing devices can be installed in front of this one, for example, caliber disks or reducing systems such as faucets or pinching devices.

In general, a nozzle of a simple design will be used on the socket of the field spraying unit. At the same time, if at all possible, it should also be that nozzle which would be used most frequently in any case.

This nozzle will be dismounted, in general, only if—against all expectations—deposits would have to be removed one day. As a rule, one cleaning of the units will be sufficient at the end of the season.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

The sole

DETAILED DESCRIPTION OF THE PREFERRED EMBODIMENTS

Figure 1:
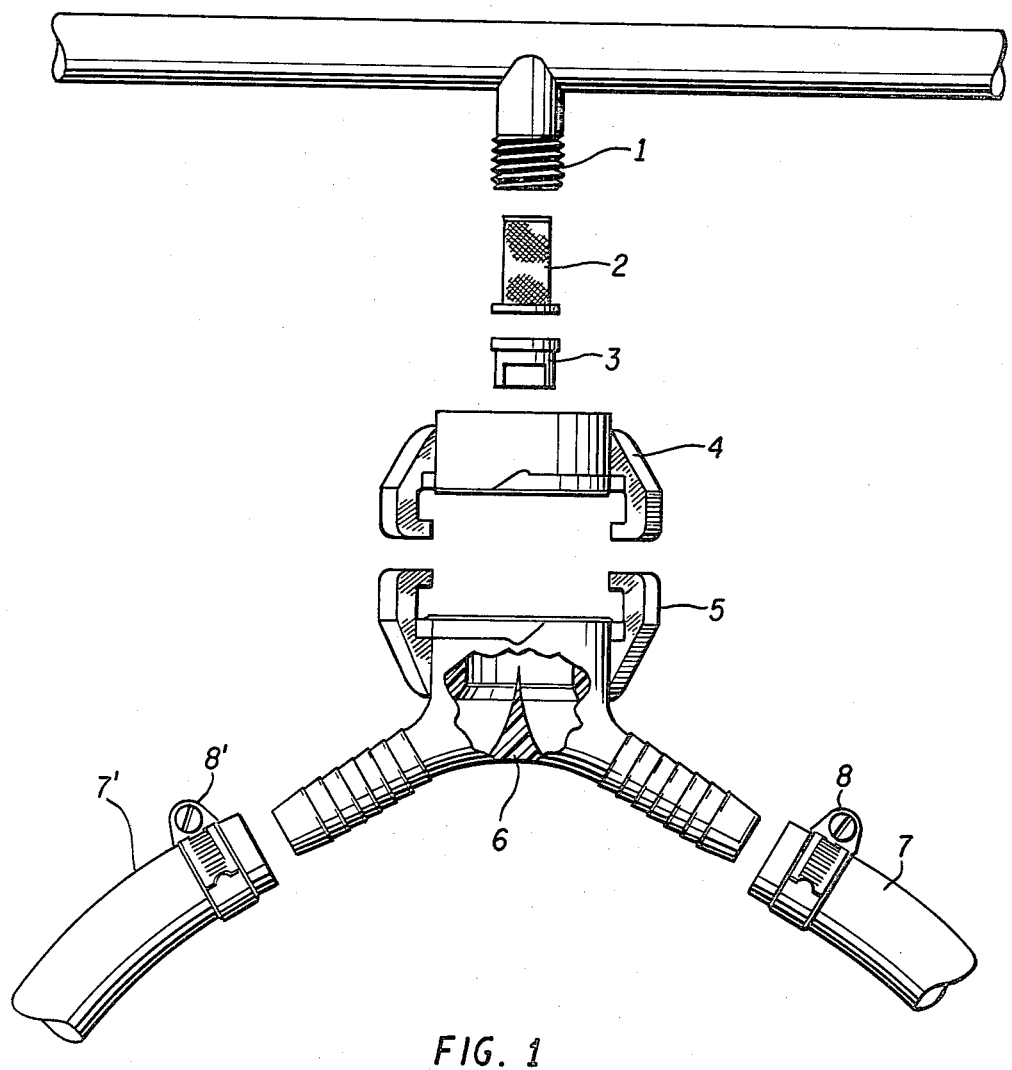
FIG. 1 is an exploded view in elevation of a quick-acting coupling in accordance with the invention.

As an example, it is shown in FIG. 1 how a quick-acting coupling 4, 5 with a distribution element 6 with two trailing hoses 7, 7' as an attachment unit is connected with the socket 1, equipped with a valve filter 2 and a universal nozzle 3, of a field spraying unit. In this example, the trailing hoses are fastened to the two spouts of the distribution element 6 by means of the tube clamps 8, 8'. However, any other type of connection can also be selected. Possible additional spacers for the trailing hoses are not shown in the drawing.

Instead of the design of quick-action couplings shown in the drawing, also other kinds can be used. Also, the primary nozzle represented in FIG. 1 can be exchanged for other nozzles and, instead of the distributor elements with trailing hoses, the already mentioned or other attachment units can be used.

The use of the quick-acting couplings according to the invention on the sockets of the field spraying units or the different attachment units results also in reducing the cost for the conversion, apart from the different operational advantages. The process of the late fertilizing of cereal with ammonium nitrate-urea solution can be carried out without loss of time after or, possibly, before additional measures for the distribution of pesticides.

The change from one type of application to another one can be effected without any complications according to the invention on any field spraying unit right at the edge of the field just before starting the spraying operation. The dismantling can also be effected as easily.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for the fast changing of the operating method of field spraying units on wheels for spraying fertilizer and/or pesticides, comprising:
   a field spraying unit having at least one socket;
   a quick-acting coupling directly connected with the socket and including one coupling part which is a screw cap, said coupling being connected to said socket at said one coupling part;
   a universal nozzle and a prefilter carried by said one coupling part;
   at least two different second coupling parts for two different fluids, said two different coupling parts being alternately releasably connected with said one coupling part; and
   an attachment unit for fluid distribution connected with each said second coupling part, whereby a second coupling part for a first fluid may be rapidly swiched for a second coupling part for a second fluid.

2. A device according to claim 1, wherein:
the attachment connected to one of said second coupling parts comprises a special nozzle, such as a flatsection nozzle.

3. A device according to claim 1, wherein:
the attachment connected to one of said second coupling parts comprises a drip tube.

4. A device according to claim 1, wherein:
the attachment connected to one of said second coupling parts comprises a distribution element having a plurality of trailing hoses.

5. A device according to claim 1, wherein:
the attachment connected to one of said second coupling parts comprises a sub-leaf spraying unit.

* * * * *

UNITED STATES PATENT AND TRADEMARK OFFICE
CERTIFICATE OF CORRECTION

PATENT NO. : 4,382,555
DATED : May 10, 1983
INVENTOR(S) : Bruno Ucinhazska et al It is certified that error appears in the above-identified patent and that said Letters Patent is hereby corrected as shown below:

On the title page add item [73] as follows:
--Assignee: RUHR-STICKSTOFF AKTIENGESELLSCHAFT--.

Signed and Sealed this

Twenty-seventh Day of December 1983

[SEAL]

Attest:

GERALD J. MOSSINGHOFF

Attesting Officer  Commissioner of Patents and Trademarks